United States Patent [19]

Das Gupta et al.

[11] 4,326,938
[45] Apr. 27, 1982

[54] PLANAR CARBON FIBER ELECTRODE STRUCTURE

[75] Inventors: Sankar Das Gupta; James K. Jacobs; Samaresh Mohanta, all of Toronto, Canada

[73] Assignee: HSA Reactors Limited, Canada

[21] Appl. No.: 99,522

[22] Filed: Dec. 3, 1979

[30] Foreign Application Priority Data

Apr. 12, 1978 [CA] Canada .................................. 317327

[51] Int. Cl.³ .................. C25B 11/02; C02F 1/46; H01M 4/00
[52] U.S. Cl. ................................. 204/228; 204/98; 204/149; 204/257; 204/290 R; 204/290 F; 204/294; 429/40
[58] Field of Search .................. 204/294, 291, 290 R, 204/290 F, 98, 284, 257, 228; 429/40

[56] References Cited

U.S. PATENT DOCUMENTS

| | | | |
|---|---|---|---|
| 3,423,247 | 1/1969 | Darland, Jr. et al. | 429/40 |
| 3,763,005 | 10/1973 | Butre et al. | 204/257 X |
| 3,953,313 | 4/1976 | Levenson | 204/294 X |
| 3,963,593 | 6/1976 | Johnson | 204/98 |
| 3,968,273 | 7/1976 | Kastening et al. | 204/294 X |
| 4,118,294 | 10/1978 | Pellegri | 204/294 X |
| 4,179,350 | 12/1979 | Deborski | 204/284 |
| 4,210,516 | 7/1980 | Mose et al. | 204/257 X |
| 4,224,129 | 9/1980 | McIntyre et al. | 204/284 X |
| 4,244,793 | 1/1981 | Johnson et al. | 204/294 X |

*Primary Examiner*—F. Edmundson
*Attorney, Agent, or Firm*—Lerner, David, Littenberg & Samuel

[57] ABSTRACT

Electrodes are disclosed which comprise a porous conductive material as a primary electrode component in electrical contact with a secondary electrode component which preferably is a metal, such as titanium. The secondary electrode component is normally conductive when operating as a cathode, and is capable of alternating between being non-conductive when operating as an anode and becoming conductive again when the electrode is operating as a cathode. Processes for removing metallic species from solution utilizing such electrodes are also disclosed.

32 Claims, 8 Drawing Figures

PLANAR CARBON FIBER ELECTRODE STRUCTURE

FIELD OF THE INVENTION

The present invention relates to apparatus for the electrolytic treatment of various electroactive species from solutions thereof. More particularly, the present invention relates to apparatus for the cathodic extraction of metallic species from solutions such as liquid waste streams and effluents from industrial processes, such as metal plating operations. Still more specifically, the present invention relates to apparatus for the electrolytic extraction of small concentrations of such electroactive species from waste waters and the like. Still more particularly, the present invention relates to processes for carrying out such electrolytic extractions.

BACKGROUND OF THE INVENTION

There are at present a variety of so-called "electrochemical" apparatus and processes in which an input of electrical power is employed in order to bring about activity at a working electrode. These electrochemical processes and apparatus are generally employed to treat solutions such as waste water and plant effluents in order to reduce metal contaminants down to levels of concentration which are acceptable, particularly in view of present day stringent environmental regulations, and to recover such metals.

There are two general categories of such electrochemical processes depending on their most significant limiting factor. The first group are those whose reaction rates are kinetically controlled, i.e., reaction rates are limited by the speed of the reactions at the electrode. In these processes the solution or electrolyte being treated contains high concentrations of electro-active species. An example of one such process is the electro-refining of zinc, where there is inherently a high concentration of zinc in the electrolyte.

The second group of electrochemical processes are those in which the reaction rates are controlled by mass transfer considerations rather than by kinetic requirements, i.e., reaction rates are limited by how much of the contaminants can be brought into contact with the cathode in a given time. In contrast to the electrodes used in kinetically controlled processes, the working electrodes used in such mass transfer controlled processes must exhibit characteristics which enhance the obtainable mass transfer rates. One such characteristic is a large surface area to volume ratio. Attempts have been made to achieve acceptable surface area to volume ratios by utilizing packed beds of fibrous or granular material, as well as active beds which can move in a flow of electrolyte. These attempts have suffered, however, from distinct disadvantages based primarily on the difficulty of providing a uniform and controlled electrical potential throughout the electrode to make full use of the surface area. As a result of this major drawback none of these mass controlled processes has achieved significant acceptance.

In all of these processes one of the prime considerations is the method of recovering the electroactive species removed from the electrolyte after it has been deposited on the working electrode. It is generally necessary to conduct a stripping step to remove the deposited material from the electrode prior to subsequent use thereof. The working electrodes used in the above-mentioned processes are sometimes prepared from the same material that is to be stripped therefrom, so that the resulting product can be used directly. More commonly, however, these electrodes are designed for mechanical stripping. In addition, in other cases the electrode must meet other requirements, such as those described in U.S. Pat. No. 3,953,312 to Levenson, where the prime consideration is that the electrode be combustible so that silver deposited on the electrode can be recovered by melting during combustion.

More recently, however, electrodes and reactors have been developed which employ carbon fibers in a manner so as to both provide a large surface area to volume ratio and at the same time limit fluctuations in the electrical potential throughout the electrode. Such electrodes and reactors are described, for example, in U.S. Pat. Nos. 4,046,663; 4,046,664; 4,108,754; 4,108,755 and 4,108,757.

Such electrodes and reactors employing them, have also been proposed, at least on a laboratory scale, by D. Yaniv and M. Ariel in an article appearing in the Journal of Electroanalytical Chemistry, Volume 79 (1977), pages 159 to 167. The structure taught therein includes an electrode of graphite cloth positioned in a frame defining an opening having an area of 2.4 cm². The authors state that their results confirm the feasibility of exploiting graphite cloth as a practical electrode material suited for flow-through configurations. However, they go on to indicate that although their laboratory reactor worked well, it would be necessary to undertake further work to optimize a reactor using a graphite cloth electrode.

A more recent approach to an electrode for use in such mass transfer controlled environments, such as in connection with dilute electrolyte solutions, is contained in Japanese Patent No. 67267/76 which was published on June 10, 1976 and which is assigned to Mitsui Petrochemical Industries Ltd. This patent discloses the use of a porous carbon electrode in connection with an electrode base material which the patentee discloses can be a number of well-known electrode materials such as platinum, iron, copper, nickel, silver, lead and certain alloys thereof. The disclosure of that patent includes the use of carbon fibers in various forms such as cloths, fabrics, felts and carbon fiber papers, which covers a base material in the form of a plate, tube, mesh or plate with holes therein. Furthermore, in Example 1 of this patent the cathode employed comprises a titanium plate which is plated with platinum and then covered with a layer of carbon fiber fabric. Thus, in effect, a platinum feeder or secondary electrode is provided. This patent does not deal with the question of how metals can be recovered from such electrodes so that the concentration of metallic ions can be reduced to extremely low levels in real time in an economical manner.

SUMMARY OF THE INVENTION

In accordance with the present invention, novel electrodes have now been discovered. They are particularly effective in mass transfer controlled electrochemical processes. The subject electrodes employ a porous conductive material as a primary electrode component in electrical contact with a secondary electrode component which comprises a metal which is normally conductive when the electrode is operating as a cathode, but which is capable of alternating between being non-conductive when the electrode is operating as an anode and again becoming conductive when the electrode again operates as a cathode.

In particular, it has been discovered that by using such electrodes in which the secondary electrode component has on its surface metals such as titanium, tantalum, tungsten, niobium, hafnium, and alloys of these metals, it is possible to carry out a process which operates in a mass transfer controlled environment and which furthermore permits cyclic recovery of metallic deposits without undue deterioration of the electrode. It is thus possible to obtain highly efficient electrochemical processes of this type by employing polarity reversal or current reversal to thereby strip the working cathode of metallic deposits thereon. The above metals or alloys may include other materials in minor amounts which provide desired additional characteristics yet do not substantially deleteriously affect the desired characteristics of the electrodes of this invention.

In accordance with the present invention the secondary electrode component comprises a conductive material which reacts with an electrolyte when acting as an anode to produce a nonconductive compound, the nonconductive compound being produced before a sufficient amount of corrosive oxidizing agents, such as an anodic gas, are produced which would deleteriously affect the primary electrode component, the non-conductive compound being capable of converting back into the conductive material upon the anode again being used as cathode. Sensing of the change from conductive to nonconductive can be used to trigger a suitable system to again operate the electrode as a cathode.

In a preferred embodiment of the present invention the porous conductive material employed as the primary electrode component comprises carbon fibers, preferably in the form of a bed or mesh.

In a preferred embodiment of the present invention the porous conductive material employed has a surface area to volume ratio of greater than about 100 $cm^2/cm^3$, and preferably exhibits an average pore size in the range of from about 0.1 to 3,000 $\mu m$, most preferably with 80% of the pores being in the range of from about 1 to 100$\mu m$ and further having a voidage of between about 30 and 99% of the volume thereof.

In another embodiment of the present invention the secondary electrode component includes a plurality of holes extending therethrough which permit the flow of electrolyte through the primary electrode component. Preferably these holes are uniformly spaced apart on the surface of the secondary electrode component.

In a preferred embodiment of the present invention the secondary electrode component is titanium. In this case the non-conductive material which forms upon use of this electrode as an anode is believed to comprise titanium dioxide, which forms a highly resistive coating during anodic use. Thus, it is further believed, as the plated metal is stripped from the electrode (anode) the titanium forming the secondary electrode component is initially laid bare and then a highly resistive non-conductive titanium dioxide coating covers the titanium, causing a sudden drop in current which is unaffected by a moderate contemporaneous voltage increase. The electrode thus becomes inactive well before significant anodic attack on the primary portion of the electrode. Furthermore, polarity reversal to again operate in the cathodic mode electro-reduces the titanium dioxide coating formed on the titanium in a rapid manner, irrespective of its highly resistive nature in the anodic mode. It thus reverts back to its original condition for further use as a low resistive feeder in the cathodic mode. What actually takes place during the above processes is probably much more complex, or may even be different, than surmised above and it is not intended that the foregoing assumptions should be considered as other than exemplary examples of what may actually be taking place.

Further in accordance with the present invention, processes for removing metallic species from solutions have also been discovered. These include contacting the solution containing these metallic species with a cathode such as that described above comprising a porous conductive material as a primary electrode component and, as a secondary electrode component, in electrical contact with the primary electrode component, a normally conductive metal capable of becoming nonconductive when employed as an anode, so as to deposit metallic species on the cathode, reversing the polarity of the cathode to convert it into an anode, thereby stripping the metallic species therefrom, and then reversing the polarity of the anode to convert it into a cathode when the secondary electrode component becomes non-conductive.

In a preferred embodiment of the process of the present invention the electrode employed in such process comprises the electrodes discussed above, and most preferably includes a secondary electrode component of titanium, tantalum, tungsten, niobium, hafnium or alloys thereof, most preferably titanium. In a preferred embodiment of this process the polarity of the cathode and the anode are periodically reversed to remove metallic species from such solutions.

BRIEF DESCRIPTION OF THE DRAWINGS

The present invention may be more fully understood with reference to the drawings, which are as follows.

DETAILED DESCRIPTION

Figure 1:
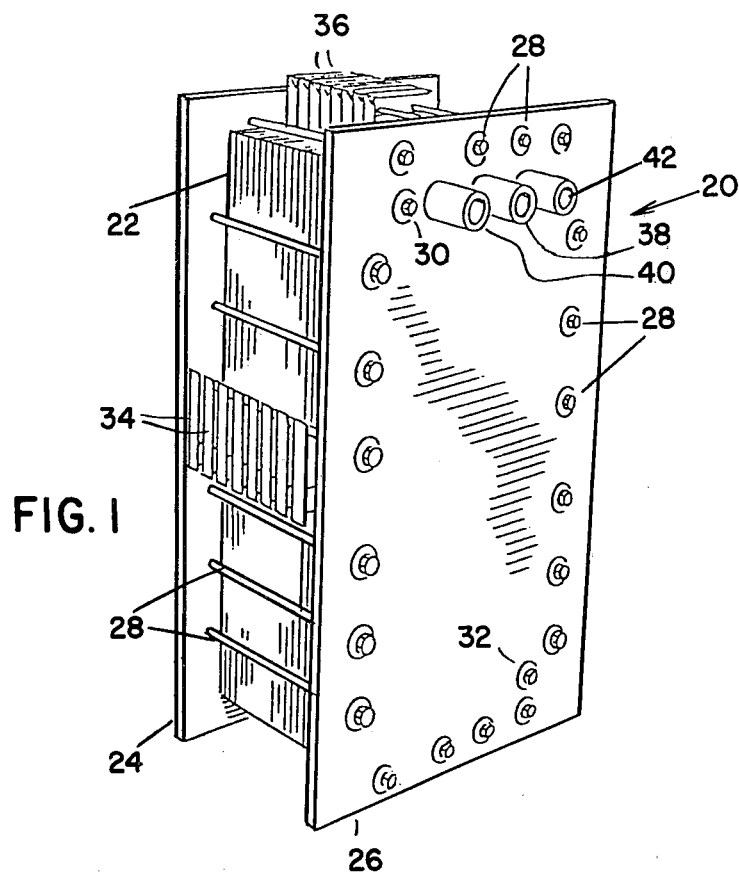
FIG. 1 is a front perspective view of a reactor produced from a number of electrochemical cells in accordance with the present invention.

By utilizing the secondary electrode components of the present invention, as discussed above, it is now possible, for example, to recycle all or a major portion of a treated solution continuously so as to effectively eliminate the need to discharge effluent, such as in plant processes, waste water treatment and the like. Because of the economics of the present invention, as well as its extreme reliability, it is possible to conduct such closed cycle treatments while at the same time substantially avoiding the need to suspend the process in order to service or repair the treatment facility. This can be accomplished in accordance with this invention by using periodic polarity reversal in such electrochemical processes. At the same time, it is also possible to now reduce metal contamination in dilute streams down to levels of concentration which can be acceptable in terms of the most stringent environmental regulations presently in effect.

Polarity reversal itself has primarily been used in various forms. No practical system has previously been developed, however, which lends itself both to continuous cyclic operation in a mass transfer controlled process and at the same time avoids significant electrode damage during the stripping cycle. In the past, when such processes employing polarity reversal have been contemplated, significant problems have arisen from the fact that during anodic operation the electrode itself becomes subject to attack, and, in fact can simply dissolve. Thus, with electrodes of the type disclosed in the aforementioned Japanese Patent No. 62767/76, for example, the electrode base materials, or so-called "feeder", as well as the carbon fibers themselves, would be subject to such attack during the anodic stripping cycle. While the feeder or electrode base material can be made of platinum or metal coated with platinum (such as is disclosed in the aforesaid Japanese patent) to thus avoid degradation thereof, this approach is not only quite expensive but in no way solves the problem of anodic attack upon the carbon fibers themselves. This anodic attack is basically the result of the production of anodic gases during stripping.

The metals employed in connection with the secondary electrode component of the present invention provide unexpected advantages. For example, applicants have discovered that during the stripping cycle when these electrodes are operating as an anode, nonconductive substances are formed before corrosive agents are produced. It is therefore possible to sense termination of the stripping operation and thus prevent attack on the primary electrode component or carbon fibers by sensing a drop in current in the anode caused by the presence of this nonconductive material. Even more significant, however, is the fact that applicants have discovered that upon further reversal of the polarity of these electrodes so as to operate again as a cathode, the secondary electrode component again becomes conductive and normal cathodic operation can continue just as before.

The exact nature of the nonconductive coatings formed in connection with the metals employed as the secondary electrode component of the present invention during their use as an anode is not entirely understood. In the case of titanium, for example, it appears that a resistive oxide coating is produced during anodic operation. However, chemically induced oxide coatings of titanium are sufficiently resistive so as to prevent their use as a cathode. These oxide coatings produced in accordance with the present invention, however, are quickly reduced during subsequent cathodic use, and it must therefore be presumed that although the electrochemically induced coatings which are formed on the titanium component herein are most probably oxides, they must nevertheless somehow be different from chemically induced titanium oxide coatings. While not wishing to be bound by any particular theory, it appears that a hydrated form of titanium dioxide is formed in connection with the present invention, and that this is a reversible form of titanium dioxide which is reduced during subsequent cathodic operation.

As for the primary electrode component of the present invention, as set forth above this comprises a highly porous conductive material which is in electrical contact with the aforementioned secondary electrode component. Most preferred are the various forms of carbon fibers also discussed above. These carbon fibers must meet certain requirements in order to be useful in mass transfer controlled processes. Thus, they must provide substantially continuous electrical conductivity throughout the electrode in order to minimize voltage and current variations. Further, the surface area of this porous conductive material should be available to the electrolyte and the material must thus have a maximum surface area to volume ratio so as to provide a high percentage of usable surface area. Preferably such ratio should exceed about 100 $cm^2/cm^3$.

In addition, the overall flow path which exists within the porous conductive material is quite significant. There must be a minimum of blind or dead end passages in the flow through the electrode structure, again to provide contact for the solution being treated. In connection with carbon fibers, for example, ideally the pores between the fibers will define tortuous paths through the electrode in order to minimize laminar flow and to encourage the break-up of boundary layers around the surfaces. The average pore size, which is of course related to voidage, should be in the range of from about 0.1 to 3000 $\mu$m, most preferably with 80% of the pores being in the range of from about 1 to 100 $\mu$m and the voidage should be in the range of from about 30 to 99% of the total volume of the electrode.

When a fibrous material is used as the porous conductive material hereof, it is necessary to restrain the fibers within the electrode. In some cases the fibers are similar to yarn rather than thread, with each yarn being made up of many smaller fibers. An example of a suitable material would be a woven cloth made up of carbon fiber yarn which is spun quite loosely but woven quite tightly. As a result, larger spaces between adjacent yarns will be minimized while the elements or fibers themselves which make up the yarn are free to move slightly in the flow of electrolyte while being controlled by the restraint to maintain the pore size required as well as the necessary pore size distribution.

It has also been found that by employing the present electrode it is possible to obtain space-time yields which are outstanding. Space-time yields are standard indicators of the performance of a heterogeneous catalytic reactor. In electrochemical engineering a convenient parameter is the amount of current carried by an electrode at high current efficiencies per unit volume of that electrode. This comparative measure of electrode efficiency can be used with a given electroactive species having a known concentration and conductivity. For a copper solution having a concentration of 640 p.p.m. at a current efficiency of 52% the following space-time yields were obtained for the various electrodes shown below:

| Reactor Type | Space-Time yield mA/$cm^3$ |
| --- | --- |
| Restrained Packed Bed | 57 |
| Fluidized Bed | 4 to 60 |
| Filter Press, Capillary gap systems etc. | 1 or less |

| Reactor Type | Space-Time yield mA/cm³ |
|---|---|
| Present electrode | Greater than 1280 |

It should also be noted that at increased flow velocities the present electrodes have demonstrated space-time yield results as high as 6800 mA/cm³ and at very low flow rates space-time yields have been recorded in the range of 500 mA/cm³.

Reference is next made to the drawings, in which FIG. 1 shows a reactor designated generally by the numeral 20. This reactor consists of a plurality of individual cells 22 arranged for operation in parallel. Each of these cells 22 includes an electrode of the present invention, for normal operation as a cathode therein. The cells are restrained between a pair of end plates 24, 26 by long bolts 28 and the parts used to make up the cells are aligned by a pair of bolts 30, 32 which pass through parts of the cells as will be explained. For the purposes of this description the reactor 20 will be described in the position shown in FIG. 1, but it is understood that it can be used in a number of orientations.

Electrical connection to the individual cells 22 is made through cathode bars 34 provided at both sides of the reactor (one side being shown in FIG. 1) and by anode bars 36 at the top of the reactor. As will be described more fully with reference to FIG. 2, an electrolyte solution to be treated, such as waste water, is fed from behind and at the bottom of the reactor as shown in FIG. 1 and exits by way of outlet 38. Anolyte is also fed from the bottom of the reactor, and exits through a further outlet 40. These outlets are used during the plating or metal removing cycle. Afterwards, when deposits on the cathode are to be stripped, the flow of waste water ceases and is replaced by a flow of a suitable electrolyte, which again enters from the bottom and behind the reactor and in this case exits through outlet 42. As will become evident from the description below, the electrolyte is made to back flush through the electrode (which is now acting as an anode) to provide some mechanical cleaning action as well as an electrochemical removal of the plated metal.

Figures 2, 3:
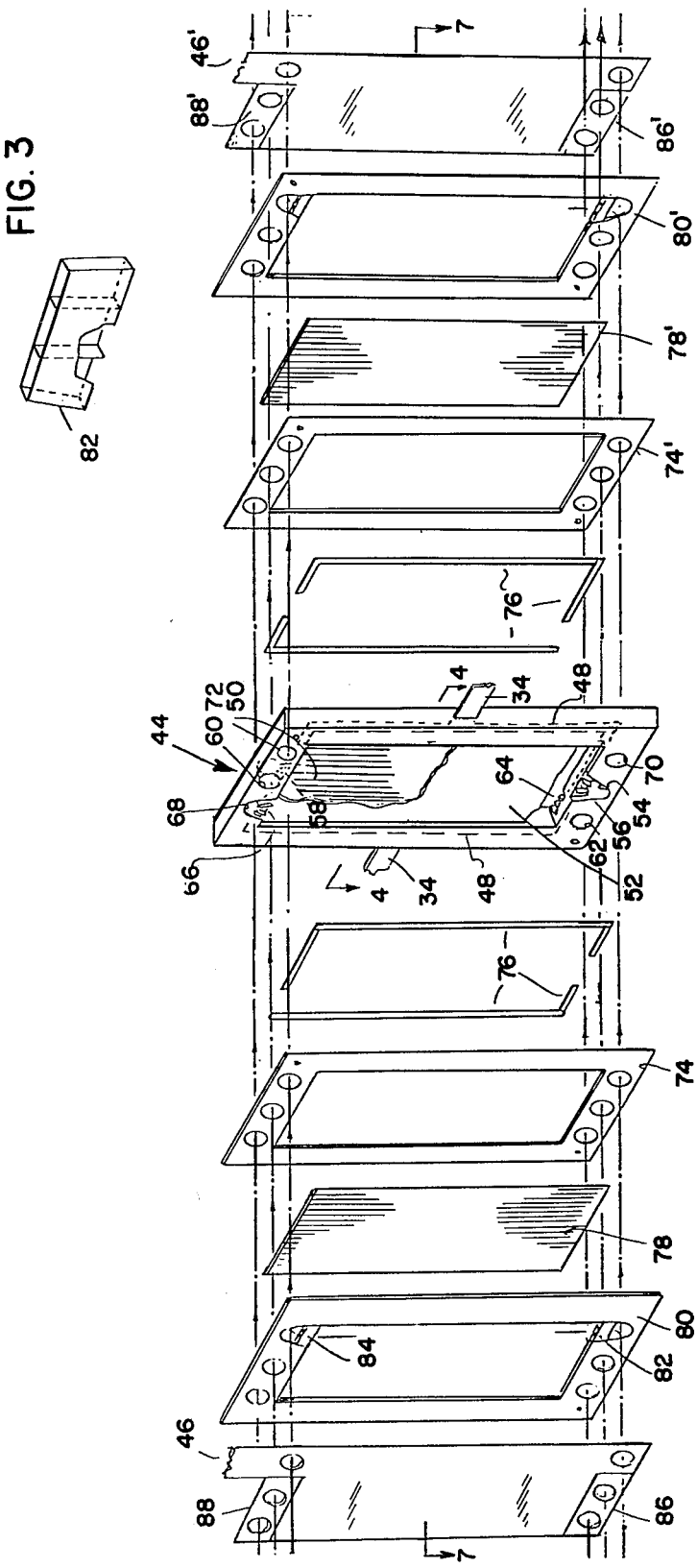
FIG. 2 is an exploded perspective view of a portion of the reactor shown in FIG. 1.
FIG. 3 is a partially broken away front perspective view of a flow divider employed in connection with the reactor of FIG. 1.

Reference is next made to FIG. 2 to illustrate some of the mechanical details of the reactor shown in FIG. 1, and, in particular, parts which make up the individual cells. As seen in FIG. 2, a cathode frame 44 is positioned for electrochemical action relative to adjacent sides of lead anodes 46, 46'. In effect, a complete cell consists of the parts shown in FIG. 2, although only the sides of the anodes facing the cathode frame are active in that cell. Opposite sides of these anodes are active in adjacent cells, except at the ends of the reactor where sides of the lead anodes adjacent the end plates 24, 26 (FIG. 1) will be insultated from these end plates and have no electrochemical effect.

Figure 4:
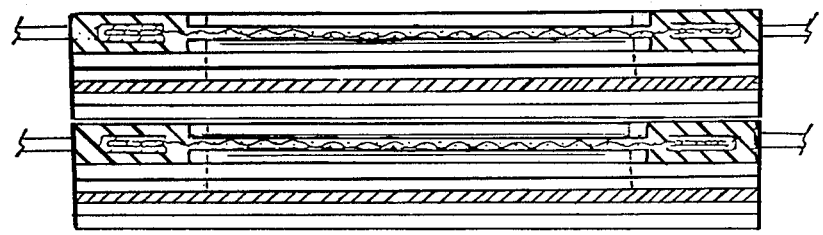
FIG. 4 is a sectional side view of a reactor made up of individual cells as set forth in FIG. 1.

The cathode frame 44 is prepared from molded polyurethane and contains peripheral conductors 48 which grip a conductive mesh 50 made up of interwoven titanium wires as can best be seen in FIG. 4. The peripheral conductors 48 are attached to the cathode bars 34 to ensure good electrical continuity from the bars to the mesh 50.

The mesh 50 forms the secondary electrode component, and two primary electrode components are attached to either side of the mesh. One primary electrode component can be seen in FIG. 2, and consists of a sheet 52 of carbon fiber cloth of the type known as Morganite 7401 G and sold by Morganite Modmor Ltd. of England. This sheet 52 is laid in surface to surface contact with the mesh 50, and is held in place by a series of titanium wire staples similar to those used in conventional stapling equipment. The staples are not shown in the drawings, but are distributed over the sheet 52 where needed to hold the sheet in place. As will be described more fully below, the edges of the sheets 52 are restrained by pressing them against the mesh 50.

The cathode frame 44 also includes a series of top and bottom openings to transport liquids as indicated with reference to the outlets 40, 42 and 38 shown in FIG. 1. For instance, waste water to be treated enters through central bottom opening 54, and a portion thereof is distributed by one of a number of inlets 56 into a space bordered on one side by an adjacent one of the sheets 52, so that the waste water flows through the cathode to its opposite side, from which it exits through one of a number of outlets 58 associated with central top opening 60, and eventually leaves the reactor through outlet 38 (see FIG. 1). This flow takes place during the treatment of waste water (i.e., with the electrode operating as a cathode) in order to remove metallic ionic species from the electrolyte solution. Subsequently, when it then becomes necessary to strip the deposited metal from the primary electrode components or sheets 52, the flow or waste water is discontinued and a stripping electrolyte is made to flow through the electrode (which will now operate as an anode by reversing the polarity of the cell electrodes). This electrolyte enters through bottom opening 62 and a number of inlets 64, and leaves by way of one of a number of top outlets 66 associated with top opening 68, before finally exiting from outlet 42 (see FIG. 1). In this case, the flow is thus again through the electrode, but in the opposite direction to that of the waste water during the initial cathodic operation, so as to enhance the flushing action of the stripping electrolyte.

The cathode frame 44 further includes bottom opening 70 and top opening 72, both of which are used for anolyte. These openings simply provide passage through the frame 44. In addition, two small openings 71, 73 are provided for receiving fitted bolts 30, 32 (see FIG. 1) in order to align the parts.

A flow chamber for the electrolyte solution such as waste water is defined on the inlet side of the electrode by space within the frame 44 itself as well as by neoprene gasket 74 adjacent the face of the frame 44, as can be seen in FIG. 4. Openings in gasket 74 are provided in alignment with the openings described with reference to the frame 44, and spacer strips 76 are compressed between an adjacent surface of the gasket 74 and the face of an adjacent one of the sheets 52 at the periphery of the sheet. These strips 76 ensure that the edges of the sheets 52 are held tightly against the mesh 50. The inlet chamber is completed by a diaphragm 78 nipped between the gasket 74 and a further neoprene gasket 80, which has openings in alignment with the openings described with reference to the frame 44. A similar outlet chamber is provided by similar parts labelled correspondingly using primed reference numerals.

The gasket 80 also provides access for anolyte into a flow chamber for the anode defined, in part, by the gasket 80, as well as by the diaphragm 78 and the lead anode 46. The assembled arrangement is better seen in FIG. 4. The flow of anolyte is facilitated by a pair of molded flow diverters 82, 84 made of polyurethane and arranged to fit in the gasket 80. One such diverter is shown in FIG. 3. Diverters 82, 84 ensure access of anolyte into the flow chamber adjacent the anode 46 so as to obtain electrochemical continuity between the adjacent surface of anode 46 and the cathode contained in the frame 44. A pair of small neoprene gasket pieces 86, 88 are shown adjacent the lead plate anode 46 in order to compensate for the thickness of the anode in the assembly, and to allow the flow of waste water and electrolyte therethrough. Openings in the anode 46 permit the flow of anolyte therethrough.

The parts described to the left of the cathode frame as shown in FIG. 2 are also duplicated to the right thereof, and as mentioned are indicated using primed reference numerals. Apart from the fact that the spacer strips 76' are slightly different because of the arrangement of inlets and outlets in frame 44, the parts to the right are identical to those described on the left of frame 44.

It will be evident from the foregoing description that each cathode is associated with two anodes, and that the parts are arranged to define a housing having a waste water flow path through the cathode. Also, during the stripping cycle the flow passes through the cathode in the opposite direction. Electrical distribution is maintained in the cathode by a combination of the mesh 50 and the natural conductivity of the two sheets 52. Because the flow is through the structure, the mesh 50 should have sufficient strength to resist flow forces and to prevent any significant distortion. Also, to ensure electrical continuity, the staples used to locate the sheets on the screen should be tight enough to ensure surface-to-surface contact between the sheets and the mesh.

Figure 5:
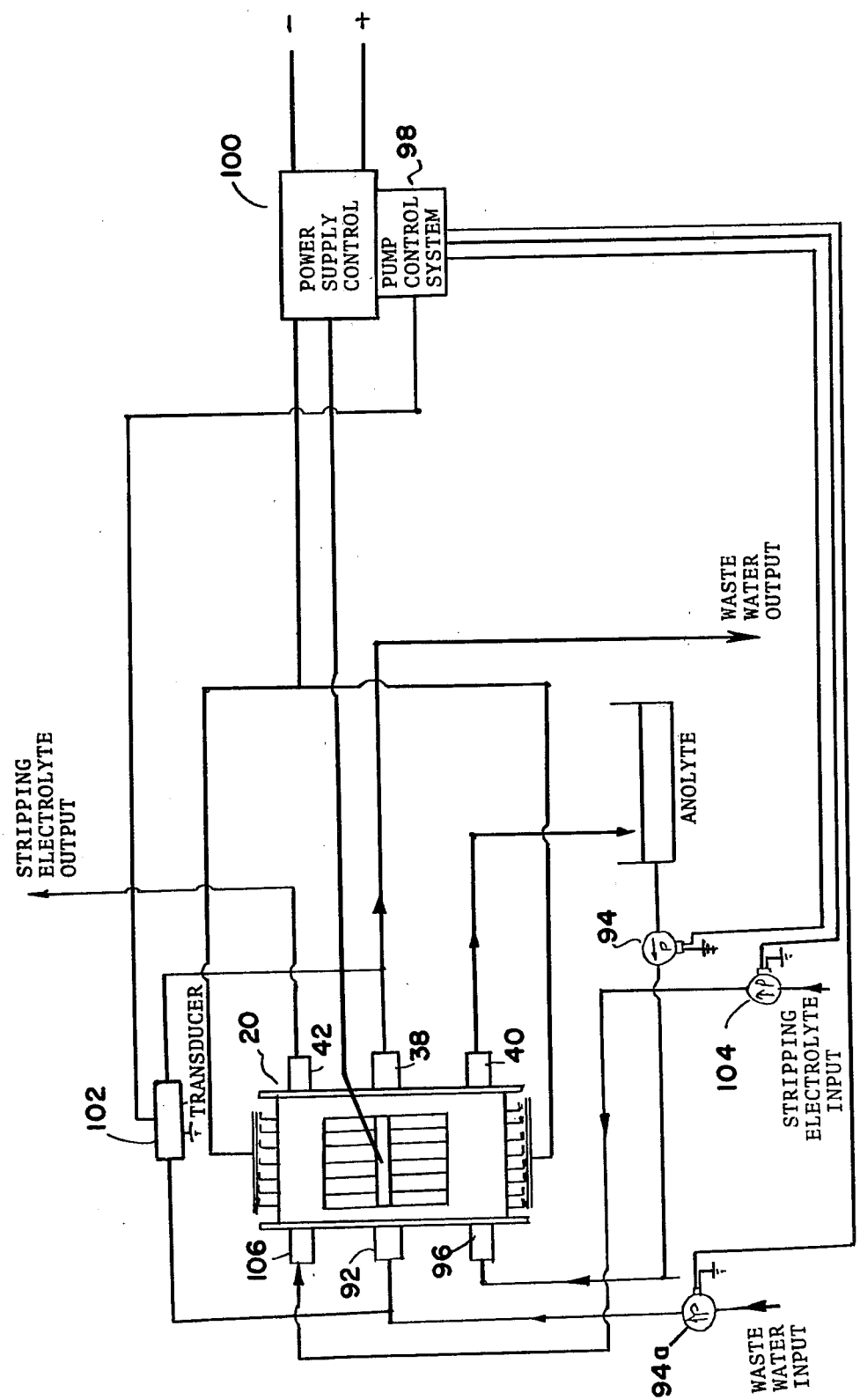
FIG. 5 is a schematic representation of a process employing the apparatus of the present invention.

Reference is next made to FIG. 5, which shows the reactor in use in a typical installation. In practice, a number of these reactors could be used in parallel, or possibly in series, with as many reactors as may be necessary in order to accommodate the volume of effluent being treated. As seen in FIG. 5 reactor 20 receives waste water input from a pump 94a by way of inlet 92, and treated waste water leaves by outlet 38. While waste water is being thus fed to the reactor, anolyte is being driven in a closed loop by pump 94 through inlet 96, to return from the reactor by way of outlet 40. The flow of waste water and anolyte is controlled electrically by a pump control system 98 associated with a power supply control 100, which normally maintains the current at a predetermined level related to the voltage requirement. After the cathode has been plated for some time, the pressure drop between the inlet 92 and outlet 38 will change and this is monitored and a signal fed to the pump control system by way of transducer 102. Once the pressure drop reaches a predetermined value, the pump control system isolates power from the pump 94a and causes the power supply control to reverse the polarity of the cathode and anode for stripping. At the same time, pump 104 is energized to feed stripping electrolyte into an inlet 106 in order to back flush the cathode (now operating as an anode), and the stripping electrolyte exits by way of outlet 42, carrying with it a concentrated solution of the metal being stripped from the waste water. The stripping cycle continues until the current drawn by the reactor decreases significantly, as caused by the formation of the highly resistive coating on the secondary electrode component, as is discussed in detail above. The power supply control 100 senses this decrease in current and again causes reversal of the polarity of the electrodes, at the same time causing the control system to re-energize the pump 94a, and isolate pump 104. The coating on the secondary portion of the electrode (again now operating as a cathode) is then electro-reduced, and again used to plate metal from the waste water. The cycle can be repeated continuously and automatically.

The pump 94 which drives the anolyte is also connected to the pump control system. Consequently, in case of emergency, the pump control system can be used to switch off this and the other pumps, while at the same time disengaging the power used to drive the reactor.

The apparatus shown diagrammatically in FIG. 5 is particularly useful in stripping nickel from waste water, such as removal of copper from copper sulfate solutions. When treating nickel, the anolyte can be a mixture of sulphuric acid and sodium sulphate, with an additive of lactic acid. Although the anolyte will become contaminated, it has been found that significant working life can be achieved using this arrangement with a very small usage of anolyte. Processes may also be conducted which do not require diaphragms such as the diaphragm 78 shown in FIG. 2.

Figure 6:
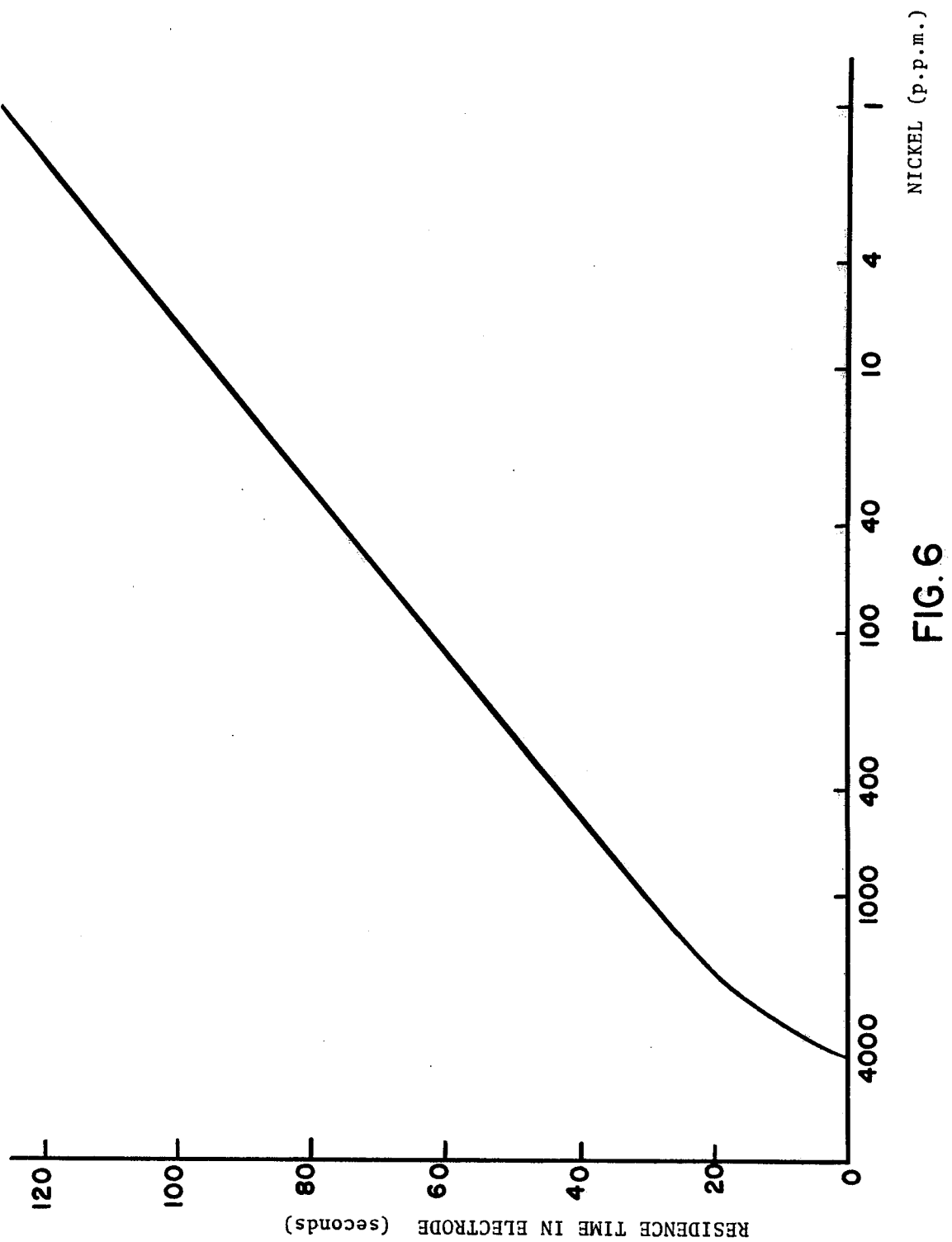
FIG. 6 is a graphical representation of results obtained employing the apparatus of the present invention.
Figure 7:
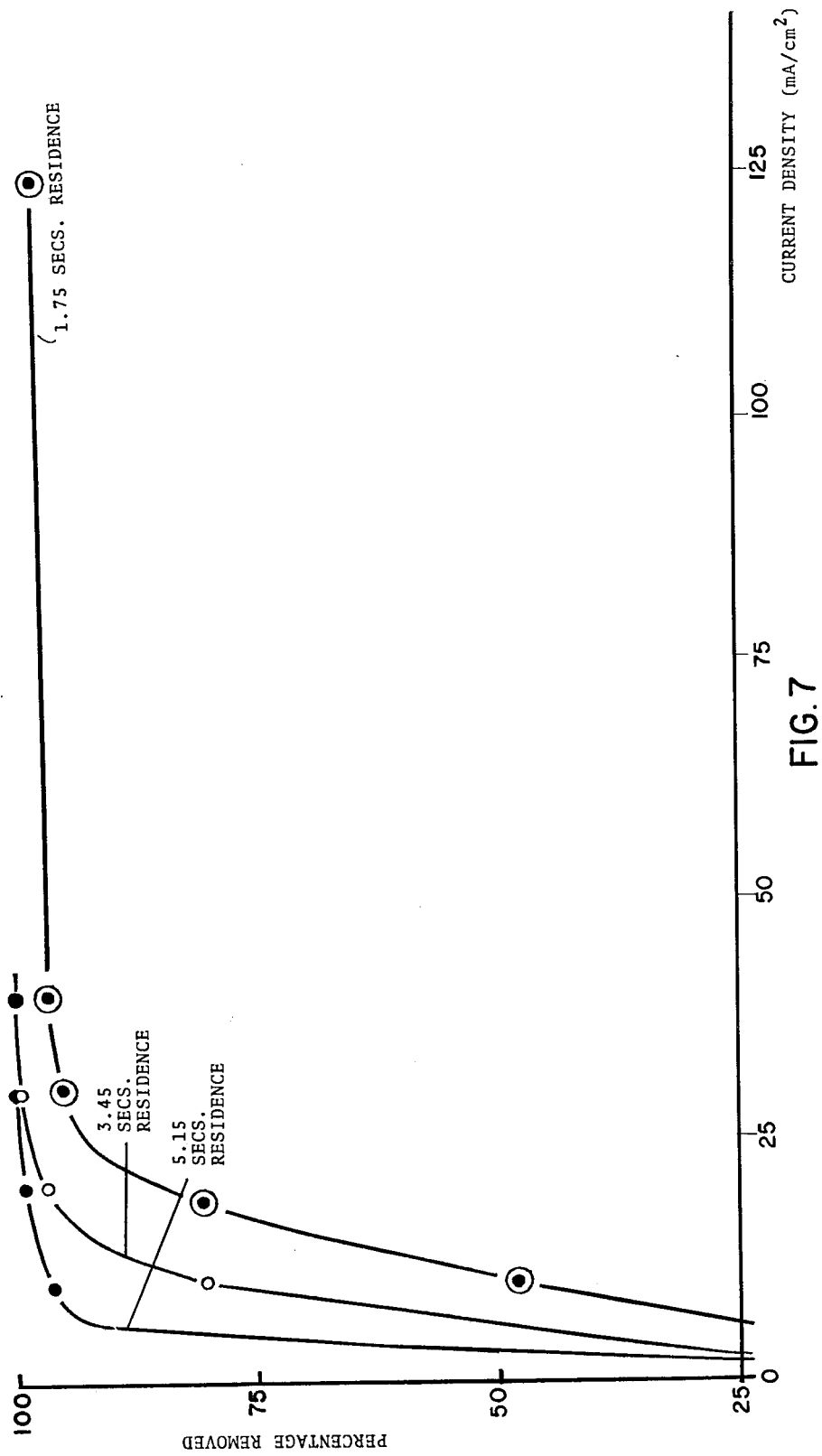
FIG. 7 is a graphical representation of further results obtained employing the apparatus of the present invention.
Figure 8:
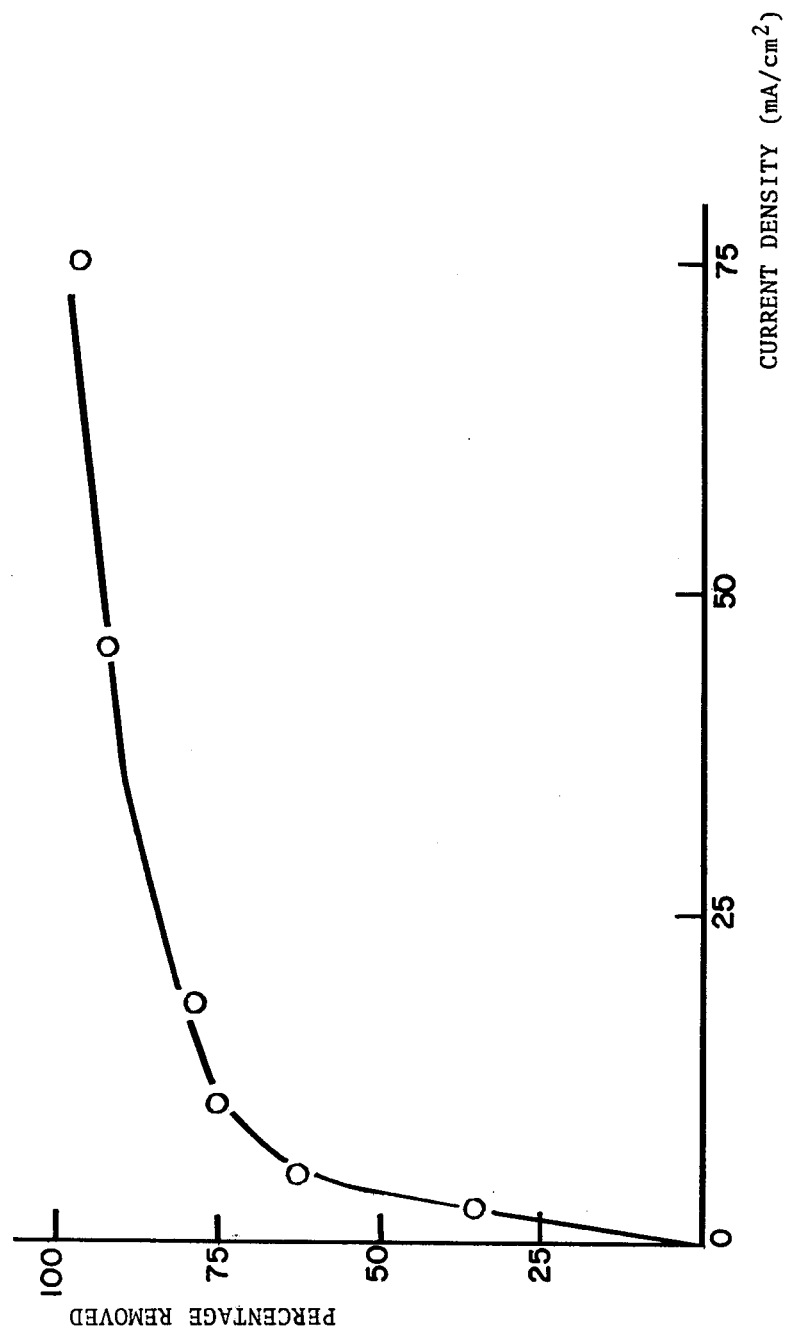
FIG. 8 is a graphical representation of further results obtained using the apparatus of the present invention.

The power supply control described above can thus maintain a constant current in which case a sudden increase in the voltage required can be used as a trigger signal. If preferred, a voltage control can be used, and when a significant drop in current occurs because the secondary electrode component becomes coated, such drop in current can be used as a trigger signal. The system can also be controlled by either setting the voltage and monitoring the current requirements or by setting the current and monitoring the voltage requirements. FIGS. 6 to 8 illustrate some of the results obtainable with apparatus of the type described. FIG. 6 thus illustrates the results obtained using a cathode having 79% voidage, an average pore size of 18 $\mu$m, a pore size distribution of 98% in the range of from 1 to 100 $\mu$m and a surface area to volume ratio of 5,600 $cm^2/cm^3$. As can be seen from FIG. 6, the initial nickel content of the waste water was 4,000 parts per million (p.p.m.). After twenty seconds, that concentration had diminished to about 2,000 p.p.m., and subsequently concentrations down to 1., p.p.m. were obtained in about 120 seconds. Such small residence times make the present process reasonably viable for use in a real time environment. This is an extremely important consideration in any commercial process, particularly where the treatment is made necessary by legislation and does not add to the quality of the finished product being made by a given commercial process.

Comparable results to those shown in FIG. 6 are shown in FIG. 7 for the removal of copper from a solution thereof. In this case, it can be seen that for very short fixed residence times of 1.75, 3.45 and 5.15 seconds, the percentage of copper removed from solution approached 100% using current densities below about 50 $mA/cm^2$. In all of these examples, the feed stream had a copper concentration of about 180 p.p.m.

Further comparable results for the removal of zinc from solution are shown in FIG. 8. In this case, the feed contained 10 p.p.m. zinc, and the residence time was again very short, in this case 3 seconds. It can be seen that in this case the percentage of zinc removed approached 100% when current densities of below 75 $mA/cm^2$ were used.

FIGS. 6 to 8 thus demonstrate some of the results which can be achieved using the present apparatus and process. After the materials have been removed from the waste water, they can thus be quickly stripped from the electrode hereof, using a suitable electrolyte. This yields an output containing a high concentration of the metal being removed. This output can be either used in other processes, or can itself be stripped electrochemically using a kinetically controlled system. Because the concentrations of this output can be very high, the efficiency of the kinetically controlled system provides no difficulty.

The preferred embodiment described is typical of many forms of apparatus incorporating the invention. The apparatus and/or process can be used to perform electroorganic synthesis e.g. dimerization of acrylonitrile to adiponitrile.

The flow arrangement can be varied and in general, particularly if the effects of the secondary electrode component are of paramount importance, any suitable conductive medium can be used in place of a carbon fiber cloth. Also the secondary electrode component can be a plate if the reactor is controlled so that there is no flow through the electrode, or a perforated sheet can be used in place of the mesh shown in the apparatus shown in the figures. All these and other such variations are within the scope of the invention as described and claimed.

What is claimed is:

1. An electrode comprising a secondary electrode component including a surface comprising a metal selected from the group consisting of titanium, tantalum, tungsten, niobium, hafnium, and alloys thereof, said secondary electrode component including a plurality of holes therethrough so as to permit a flow of electrolyte therethrough, electrical contact means in electrical contact with said secondary electrode component so that outside electrical contact to said electrode is made through said secondary electrode component, a primary electrode component comprising a porous conductive material in electrical contact with said secondary electrode component, whereby said electrode is capable of alternating between acting as a cathode and an anode by said secondary electrode component being conductive when said electrode is acting as a cathode, by becoming non-conductive when said electrode is acting as an anode, and by being capable of converting back to being conductive when said electrode is again acting as a cathode.

2. The electrode of claim 1 wherein said porous conductive material comprises carbon fibers.

3. The electrode of claim 2 wherein said carbon fibers are in the form of a bed or mesh.

4. The electrode of claim 1 or 2 wherein said porous conductive material has a surface area to volume ratio of greater than about 100 $cm^2/cm^3$.

5. The electrode of claim 1 wherein said metal comprises titanium.

6. The electrode of claim 1 wherein said plurality of holes are uniformly spaced apart.

7. The electrode of claim 6 wherein said metal comprises titanium.

8. The electrode of claim 4 wherein at least about 80% of the pores of said porous conductive material are in the range of from about 1 to 100 $\mu$m.

9. An electrode usable in connection with an electrolyte, said electrode comprising a primary electrode component comprising a porous conductive material, and a secondary electrode component in electrical contact with said primary electrode component, said secondary electrode component comprising a metal which is normally conductive when said electrode is operating as a cathode, and which is capable of alternating between being non-conductive when said electrode is operating as an anode and again becoming conductive when said electrode is again operating as a cathode.

10. The electrode of claim 9 wherein said porous conductive material has a surface area to volume ratio greater than about 100 $cm^2/cm^3$.

11. The electrode of claim 9 wherein said porous conductive material comprises carbon fibers.

12. The electrode of claim 9 wherein said metal of said secondary electrode component is a metal selected from the group consisting of titanium, tantalum, tungsten, niobium, hafnium, and alloys thereof.

13. The electrode of claim 9 wherein said secondary electrode component includes a plurality of holes therethrough so as to permit the flow of said electrolyte through said primary electrode component.

14. The electrode of claim 13 wherein said plurality of holes are uniformly spaced apart.

15. The electrode of claim 12 wherein said metal of said secondary electrode component comprises titanium.

16. The electrode of claim 9 or 10 wherein at least about 80% of the pores of said porous conductive material are in the range of from about 1 to 100 $\mu$m.

17. An electrode usable in connection with an aqueous electrolyte, said electrode comprising a primary electrode component comprising a porous conductive material, and a secondary electrode component in electrical contact with said primary electrical component, said secondary electrode component comprising a conductive material comprising a metal selected from the group consisting of titanium, tantalum, tungsten, niobium, hafnium and alloys thereof which reacts with said electrolyte when acting as an anode to produce a non-conductive compound, said non-conductive compound being produced before a sufficient amount of oxygen is produced at said secondary electrode so as to deleteriously affect said primary electrode, said non-conductive compound being capable of converting back into said conductive material upon said anode being again used as a cathode.

18. The electrode of claim 17 wherein said non-conductive compound comprises an oxide of said conductive material.

19. The electrode of claim 17 wherein said porous conductive material comprises carbon fibers.

20. The electrode of claim 19 wherein said conductive material comprises titanium.

21. The electrode of claim 14 wherein said conductive material includes a plurality of holes therethrough so as to permit the flow of said electrolyte through said primary electrode component.

22. The electrode of claim 21 wherein said plurality of holes are uniformly spaced apart.

23. The electrode of claim 20 wherein said conductive material includes a plurality of holes therethrough so as to permit the flow of said electrolyte through said primary electrode component.

24. The electrode of claim 23 wherein said plurality of holes are uniformly spaced apart.

25. An electrode usable in connection with an aqueous electrolyte, said electrode comprising a primary electrode component comprising a porous conductive material, a secondary electrode component in electrical contact with said primary electrode component, and electrical contact means in electrical contact with said secondary electrode component so that outside electrical contact to said electrode is made through said secondary electrode component, said secondary electrode component comprising a conductive material which reacts with said electrolyte when acting as an anode to produce a non-conductive compound, said non-conductive compound being produced before a sufficient amount of a corrosive agent is produced so as to deleteriously affect said primary electrode component, said non-conductive compound also being capable of converting back into said conductive material upon said anode again being used as a cathode.

26. The electrode of claim 1 including flow means for flowing said electrolyte through said electrode when said electrode is acting as a cathode, polarity reversal means for reversing the polarity of said electrode so that it acts as an anode, and sensing means for sensing when said secondary electrode component becomes non-conductive.

27. The electrode of claim 26 including flow sensing means for sensing a reduction in said flow of said electrolyte through said electrode whereby said polarity reversal means may then be actuated.

28. The electrode of claim 27 wherein said flow sensing means comprises a transducer.

29. The electrode of claim 26 or 27 wherein said flow means comprises pump means.

30. The electrode of claim 26 or 27 wherein said sensing means comprises means for sensing a decrease in the current flowing through said electrode.

31. The electrode of claim 26 or 27 wherein said sensing means comprises means for sensing an increase in the voltage across said electrode.

32. The electrode of claim 26 wherein said reverse flow means comprises means for flowing a stripping electrolyte through said electrode.

* * * * *

REEXAMINATION CERTIFICATE (342nd)
United States Patent [19]
Das Gupta et al.

[11] B1 4,326,938
[45] Certificate Issued Apr. 30, 1985

[54] PLANAR CARBON FIBER ELECTRODE STRUCTURE

[75] Inventors: Sankar Das Gupta; James K. Jacobs; Samaresh Mohanta, all of Toronto, Canada

[73] Assignee: HSA Reactors Limited, Canada

Reexamination Request:
No. 90/000,458, Oct. 12, 1983

Reexamination Certificate for:
Patent No.: 4,326,938
Issued: Apr. 27, 1982
Appl. No.: 99,522
Filed: Dec. 3, 1979

[30] Foreign Application Priority Data

Apr. 12, 1978 [CA] Canada ................................ 317327

[51] Int. Cl.³ .................... C25B 11/02; C02F 1/46; H01M 4/00

[52] U.S. Cl. ..................................... 204/228; 204/98; 204/149; 204/257; 204/290 R; 204/290 F; 204/294; 429/40

[58] Field of Search ................. 204/98, 228, 257, 284, 204/290 R, 290 F, 294, 291; 429/40

[56] References Cited
U.S. PATENT DOCUMENTS 4,108,757 8/1978 Fleet et al. .......................... 204/294
4,235,695 11/1980 De Nora et al. .................... 204/268

Primary Examiner—John F. Niebling

[57] ABSTRACT

Electrodes are disclosed which comprise a porous conductive material as a primary electrode component in electrical contact with a secondary electrode component which preferably is a metal, such as titanium. The secondary electrode component is normally conductive when operating as a cathode, and is capable of alternating between being non-conductive when operating as an anode and becoming conductive again when the electrode is operating as a cathode. Processes for removing metallic species from solution utilizing such electrodes are also disclosed.

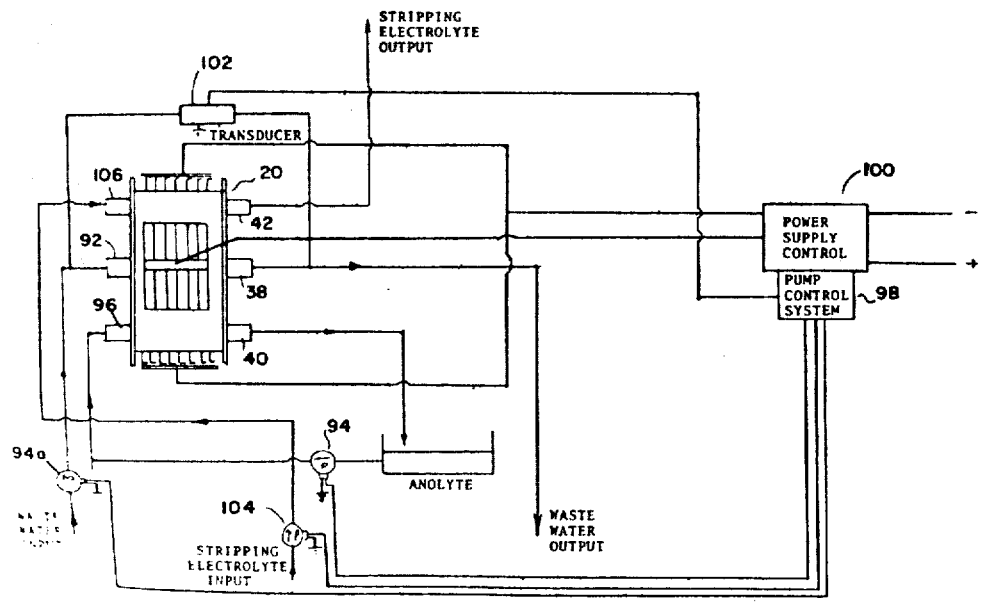

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 17 and 25 are determined to be patentable as amended.

Claims 2-8, 10-16, 18-24 and 26-32, dependent on an amended claim, are determined to be patentable.

1. [An electrode] *A mono-polar electrode capable of alternate use as both a cathode and an anode* comprising a secondary electrode component including a surface comprising a metal selected from the group consisting of titanium, tantalum, tungsten, niobium, hafnium, and alloys thereof, said secondary electrode component including a plurality of holes therethrough so as to permit a flow of electrolyte therethrough, electrical contact means in electrical contact with said secondary electrode component so that outside electrical contact to said electrode is made through said secondary electrode component, a primary electrode component comprising a porous conductive material *having an outer surface and being* in electrical contact with said secondary electrode component *said outer surface of said porous conductive material being substantially free of said secondary electrode component,* whereby said electrode is capable of alternating between acting as a cathode and an anode by said secondary electrode component being conductive when said electrode is acting as a cathode, by becoming non-conductive when said electrode is acting as an anode, and by being capable of converting back to being conductive when said electrode is again acting as a cathode.

9. [An electrode] *A mono-polar electrode capable of alternate use as both a cathode and an anode* usable in connection with an electrolyte, said electrode comprising a primary electrode component comprising a porous conductive material *having an outer surface,* and a secondary electrode component in electrical contact with said primary electrode component, *said outer surface of said primary electrode component being substantially free of said secondary electrode component,* said secondary electrode component comprising a metal which is normally conductive when said electrode is operating as a cathode, and which is capable of alternating between being non-conductive when said electrode is operating as an anode and again becoming conductive when said electrode is again operating as a cathode.

17. [An electrode] *A mono-polar electrode capable of alternate use as both a cathode and an anode* usable in connection with an aqueous electrolyte, said electrode comprising a primary electrode component comprising a porous conductive material *having an outer surface,* and a secondary electrode component in electrical contact with said primary electrical component, *said outer surface of said primary electrode component being substantially free of said secondary electrode component,* said secondary electrode component comprising a conductive material comprising a metal selected from the group consisting of titanium, tantalum, tungsten, niobium, hafnium and alloys thereof which reacts with said electrolyte when acting as an anode to produce a non-conductive compound, said non-conductive compound being produced before a sufficient amount of oxygen is produced at said secondary electrode so as to deleteriously affect said primary electrode, said non-conductive compound being capable of converting back into said conductive material upon said anode being again used as a cathode.

25. [An electrode] *A mono-polar electrode capable of alternate use as both a cathode and an anode* usable in connection with an aqueous electrolyte, said electrode comprising a primary electrode component comprising a porous conductive material *having an outer surface,* a secondary electrode component in electrical contact with said primary electrode component, *said outer surface of said primary electrode component being substantially free of said secondary electrode component,* and electrical contact means in electrical contact with said secondary electrode component so that outside electrical contact to said electrode is made through said secondary electrode component, said secondary electrode component comprising a conductive material which reacts with said electrolyte when acting as an anode to produce a non-conductive compound, said non-conductive compound being produced before a sufficient amount of a corrosive agent is produced so as to deleteriously affect said primary electrode component, said non-conductive compound also being capable of converting back into said conductive material upon said anode again being used as a cathode.

* * * * *